(No Model.)
J. JUDSON.
GOVERNOR.
No. 349,847. Patented Sept. 28, 1886.
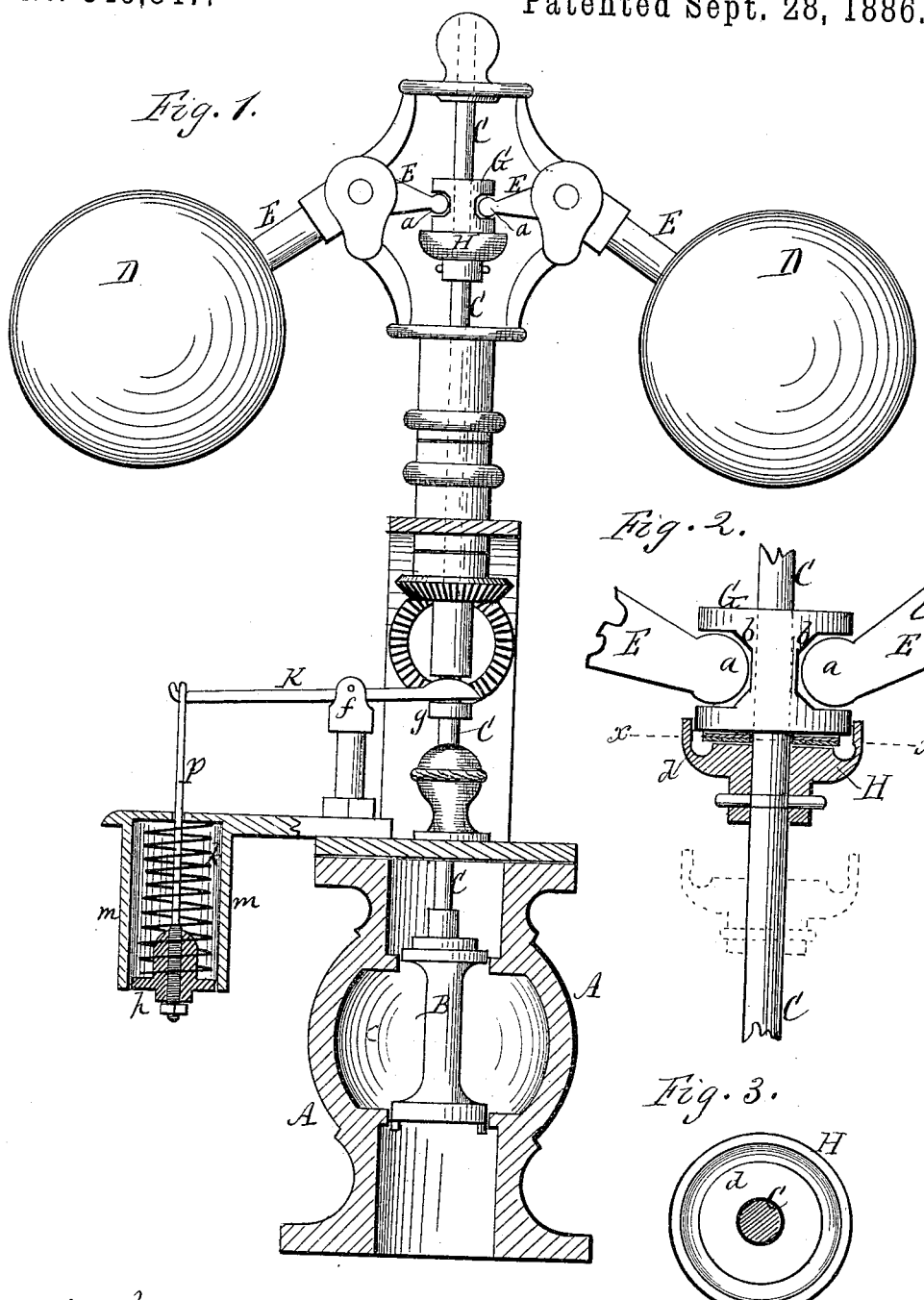
Attest.
P. A. Costich
Mary McDermott
Inventor.
Junius Judson,
Jr R. F. Osgood,
Atty.

UNITED STATES PATENT OFFICE.

JUNIUS JUDSON, OF ROCHESTER, NEW YORK.

GOVERNOR.

SPECIFICATION forming part of Letters Patent No. 349,847, dated September 28, 1886.

Application filed January 27, 1886. Serial No. 189,989. (No model.)

*To all whom it may concern:*

Be it known that I, JUNIUS JUDSON, of the city of Rochester, in the county of Monroe and State of New York, have invented a certain new and useful Improvement in Governors; and I do hereby declare that the following is a full, clear, and exact description of the same, reference being had to the drawings accompanying this application.

My improvement relates to what is known as the "Judson governor," in which a rod or spindle extends from the valve up to the top of the governor, and the arms of the balls are connected therewith by means of a slotted spool, which revolves freely on the spindle.

The invention consists in the combination, with the spindle, the balls, and the spool, of a cup made fast to the spindle under the spool and serving the double purpose of a bearing for the spool and as a receptacle to hold oil, in which the spool revolves, all as hereinafter described.

In the drawings, Figure 1 is an elevation, partially in section, of a Judson governor, showing my improvement applied thereto. Fig. 2 is an enlarged elevation, partially in section, of the spindle, the spool, the ball-arms connected therewith, and the cup. Fig. 3 is a cross-section of Fig. 2 in line $x$ $x$.

The drawings show an ordinary Judson governor, in which A is the globe or casing. B is the valve which plays therein. C is the valve rod or spindle, which extends through the frame to the top of the governor and plays up and down freely to operate the valve. D D are governor-balls. E E are the arms, and G is the spool, such as has heretofore been in use on this kind of governor. The arms are provided with knuckles $a$ $a$, which fit in notches $b$ $b$ of the spool, so that as the balls rise and fall under the centrifugal action the spool, and with it the spindle with the valve attached, will be correspondingly thrown.

To produce the throw of the spindle, a stop must be used under the spool for the latter to act upon, and this stop heretofore has been simply a ring or shoulder over which the spool rested. The spool has to be frequently oiled, and much difficulty has been experienced to retain the oil, as its tendency is to run down the spindle. To obviate this difficulty, I employ the following arrangement:

H is a stop in the form of a cup, pinned or otherwise firmly attached to the spindle under the spool, and forming the shoulder against which the latter rests to throw the spindle down as the balls rise. The bottom of the spool lies in this cup and revolves in the body of oil or grease resting therein. I prefer to insert one or more steel washers, $d$ $d$, around the spindle in the cup, on which washers the spool rests; but they may be dispensed with, if desired. By the means above described the spool rests in a body of oil in the cup, and can revolve a long time without refilling the cup, and when the latter is done the cup is lowered, by means hereinafter described, into the position indicated by dotted lines, Fig. 2, which leaves the top of the cup entirely open for the pouring in of the oil. In addition to serving as an oil-cup to retain the oil, the cup serves as the necessary stop to the spool to throw the spindle down under the action of the balls.

K is a lever having its pivot at $f$, and provided with a forked end embracing the lower end of the spindle and resting over a shoulder, $g$, of the spindle. By throwing the outer end of the lever up the spindle will be drawn down, removing the cup from the spool, as before described, and allowing the cup to be filled with oil. The outer end of the lever is connected with a rod, $p$, attached to a follower, $h$, pressed down by a spring, $k$, in a barrel, $m$, by which means constant tension is made to bear up against the spindle.

By the use of the lever, as above described, the spindle can be lowered at any time to free the cup from the spool, which is a great convenience, as the spindle could not be well operated otherwise.

I am aware that it is common to use an oil-cup as a bearing to some revolving part that rests therein; but such I do not broadly claim, my invention consisting in combining the oil-cup with the spindle, the revolving spool, and the ball-arms in the specific manner described; also with the lever below, by which the cup can be readily separated from the spool for filling.

Having described my invention, what I claim as new, and desire to secure by Letters Patent, is—

1. In a governor, the combination, with the spindle and governor-ball arms, of a spool turning freely on the spindle and slotted to receive the arms, and a cup fastened to the spindle below the spool, serving as a bearing to the spool and a receptacle for oil, in which the spool revolves, as hereinbefore set forth.

2. In a governor, the combination, with the spindle and governor-ball arms, of a spool turning freely on the spindle and provided with slots to receive the arms, a cup fastened to the spindle below the spool, and a lever connected with the spindle, by which the spindle can be thrown to separate the cup from the spool, as herein set forth, and for the purpose specified.

In witness whereof I have hereunto signed my name in the presence of two subscribing witnesses.

JUNIUS JUDSON.

Witnesses:
R. F. OSGOOD,
P. A. COSTICH.